Patented May 31, 1932

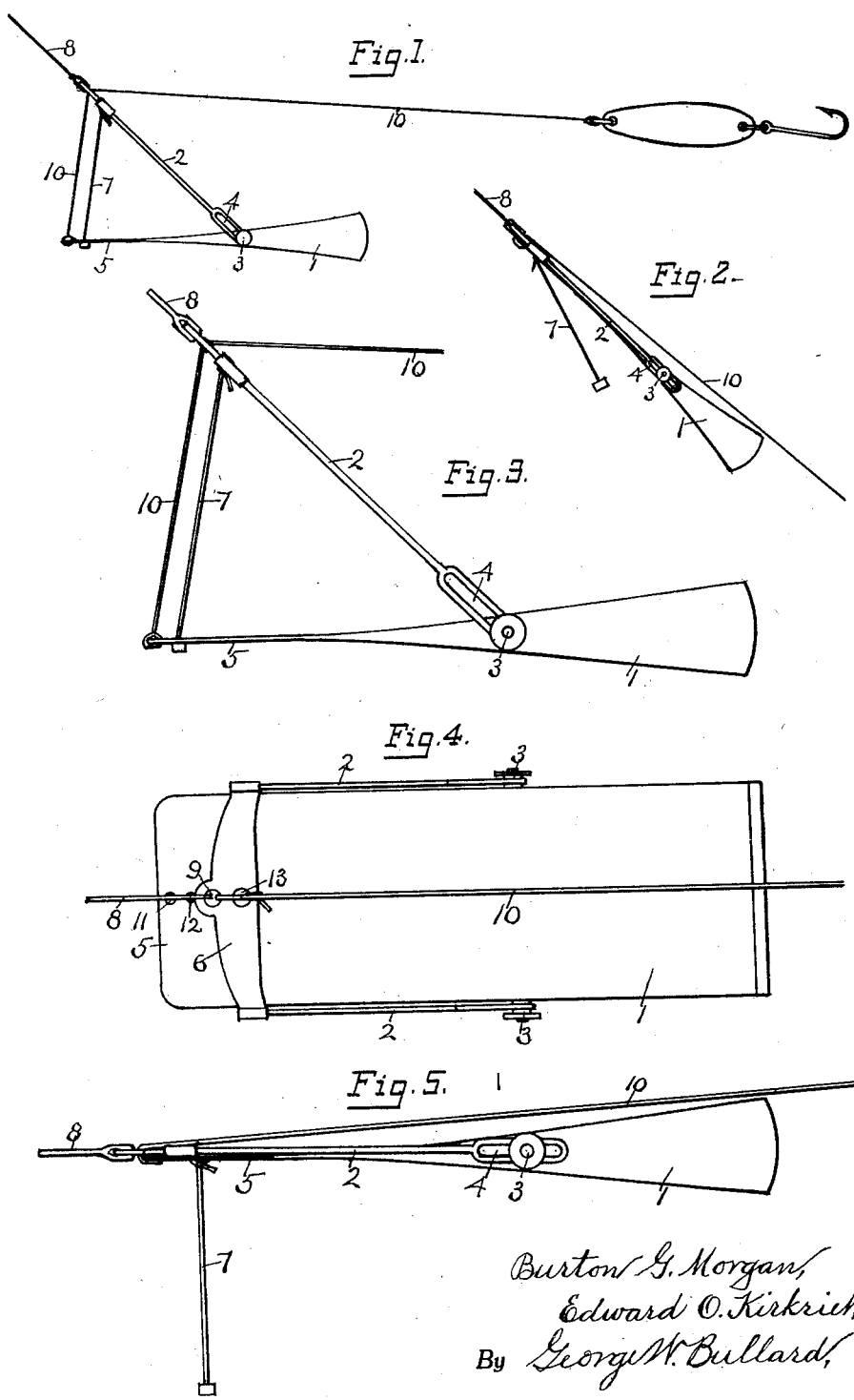

1,861,237

UNITED STATES PATENT OFFICE

BURTON G. MORGAN AND EDWARD O. KIRKRIET, OF TACOMA, WASHINGTON

FISHHOOK SINKER

Application filed August 11, 1930. Serial No. 474,350.

Our invention pertains to devices for sinking and holding fish hooks at a desirable depth in the water when trolling for salmon and other fish with a hook and line. Heretofore, fish hook sinkers have commercially been made of lead, varied in size, form and weight, so proportioned as the size of the hook and the depth of the fishing may require. While much thought and care has been given to the making of lead fish hook sinkers, they are cumbersome and expensive, are liable to be jerked loose and lost by the frantic actions of the fish when caught, or by being fouled on rocks and other objects in the water, all of which means loss and disappointment to the fishermen when trolling.

To overcome these and other objections to the present form of fish hook sinkers, we have conceived the idea of devising a sinker that is lighter than water and thus do away with the lead sinkers for trolling.

One object of our invention, therefore, is to provide a fish hook sinker for trolling that is lighter than water, that will float when not in motion and when trolling will sink to the depth desired, the depth being governed by the length of the trolling line, the angle of the sinker therewith and the buoyancy of the rear end of the sinker.

Another object of our invention is to provide a fish hook sinker that can be made at less cost than the present form of sinkers and that can be handled with greater ease because of its lightness.

Another object of our invention is to provide a fish hook sinker that is lighter than water, self sinking when trolling and in which the sinking action terminates with the catching of a fish, thus saving the added weight and strain of a lead sinker on the trolling line when pulling in the fish.

A still further object of our invention is to provide a fish hook sinker that is easier to troll than a lead sinker, less liable to be fouled on rocks or other objects in the water and not liable to be lost by the violent action of the fish when caught.

We attain these and other objects by means of the device illustrated in the drawings, in which:—

Figure 1 is a side view of our invention in the position of trolling with a fish hook and metal lure attached.

Figure 2 is a side view of our invention as it appears when closed up after a fish is caught and is being pulled in.

Figure 3 is an enlarged side view of our invention which more clearly shows it in detail.

Figure 4 is a top view of Figure 3.

Figure 5 shows Figure 3 closed up like Figure 2.

Similar characters refer to similar parts in the several views.

Our invention comprises a wedge-shaped sinker 1, preferably of sheet metal, with an air cavity in the butt end. This sinker is attached to the arms 2—2 of a yoke-like bail by means of fixed screw cap stubs 3 set through slots 4 in the ends of the bail arms. The bail when drawn tight will allow the point 5 of the wedge-shaped sinker to pass between the bail arms, but when drawn forward as shown in Figs. 2 and 5, the point 5 contacts the top loop 6 of the bail which is made flat and wide to secure rigidity and to provide space for the fishing line holes as required for trolling. When the point 5 is thus drawn in contact with the top loop 6, the sinker and bail are held together and in alinement and are easily drawn through the water. The swing of the sinker point from the bail is limited by a stay line 7 which can be varied to pull the sinker at any angle desired.

The trolling line 8 is fixed in the front hole 9 at the center of the bail loop 6. The fish hook line 10 is passed through hole 9 and fixed to the sinker point 5 through the front hole 11. The stay line 7 having a knot or preferably a metal button on its lower end, is passed through a second hole 12 in point 5 and has its upper end fastened through a second hole 13 in the bail top loop. Our invention is now completed for the use of the fisherman.

Our newly invented sinker as now shown and described is so made that the air cavity therein will float the whole device with the fish hook and lure attached. When put in the water the point 5 of the sinker will go down with the butt end up. On starting to troll the bail will pull away from the sinker and its flat side will be drawn against the water at an acute angle. The studs 3 being approximately two-thirds the length of the sinker back from the point 5 will cause the greater pressure on the front end and the action of the water against the sinker will cause the sinker to dive down into the water where it will follow the trolling line at an angle as shown in Fig. 1. The depth at which the sinker will follow the trolling line will be governed by the length of the line let out and its line of travel through the water will be at quite uniform level, varying but a few inches.

Now when a fish is caught on the hook 14, its frantic pull on the line 10 will instantly draw the point 5 of the sinker up and forward till the sinker and bail are in alinement as shown in Fig. 2. The sinker thus closed will offer very little resistance in the water and no weight to the trolling line, and the frantic actions of the fish is less liable to cause the loss of either the sinker or the fish than when a lead sinker is used.

Should the fisherman wish to inspect his hook at any time, he can stop trolling and the sinker will rise to the surface of the water where needed repairs or rebaiting can be done and the trolling be continued as before.

It is to be observed that our invention can be varied in size and in proportion to carry any size or kind of fish hook. It is also designed to be used in either salt or fresh waters. For deep sea fishing the air cavity can be made to resist the increased water pressure by reinforcing with internal ribs, or by filling the cavity with cork or other light firm substance. We also propose to make our invention less buoyant so that the wedge-shaped part will rest point downward at a desired depth below the surface of the water. This will facilitate trolling the sinker for deep water fishing than if sufficiently buoyant to rest at the surface. It will be seen that the buoyancy must be in or at the butt end of the sinker in order to hold it in an upright position and the trolling bail must be slightly to the rear of the lineal center in order to secure the diving action when starting to troll and to hold it at practically a uniform depth while trolling.

The form and proportions of our invention as shown in the drawings have been adopted after making many experiments and observations, and the device has been found and proven practical and effective in attaining the objects desired.

We do not limit ourselves to the use of metal only in the making of our invention, but reserve the right to use wood or other like materials in making the wedge-shaped sinker and to treat the same so as to be impervious to the water.

We claim:—

1. A wedge-shaped fish hook sinker for trolling, a trolling line and bail attached thereto by pivotal means in the edges of said sinker and to the rear of its lineal center, means for staying said bail at a desired acute angle with the point end side of said sinker, and a fish hook with line attached, said line passed through a hole in said bail and attached to the front end of said sinker, whereby said front end of said sinker will be drawn to and against said bail by the pull of a fish when caught on said fish hook.

2. A wedge-shaped fish hook sinker for trolling, pivotal means for so attaching and staying said sinker to a trolling line at an acute angle therewith, and said pivotal means attached to the edges of said wedge-shaped fish hook sinker and to the rear of its lineal center.

BURTON G. MORGAN.
EDWARD O. KIRKRIET.